United States Patent [19]

Erfeling

[11] 3,760,769
[45] Sept. 25, 1973

[54] FLOOR GRATE IN CAGES OR BATTERIES OF CAGES FOR KEEPING POULTRY

[75] Inventor: Arthur Erfeling, Altenwalde, Germany

[73] Assignee: Lohmann-Apparatebau Kommanditgesellschaft, Cuxhaven, Germany

[22] Filed: Mar. 30, 1971

[21] Appl. No.: 129,503

[30] Foreign Application Priority Data
Apr. 4, 1970 Germany............... P 20 16 227.0

[52] U.S. Cl.................... 119/48, 119/19, 119/22
[51] Int. Cl..................... A01k 31/14, A01k 31/18
[58] Field of Search .............. 119/45, 47, 48, 21, 119/19, 22, 17

[56] References Cited
UNITED STATES PATENTS

| | | | |
|---|---|---|---|
| 3,326,186 | 6/1967 | Doll | 119/19 |
| 3,641,983 | 2/1972 | Keen et al | 119/19 X |
| 3,029,789 | 4/1962 | Fisher | 119/48 |
| 2,692,578 | 10/1954 | Manning | 119/48 |
| 3,242,904 | 3/1966 | Rannou | 119/48 |
| 2,606,525 | 8/1952 | Johnson | 119/48 |

FOREIGN PATENTS OR APPLICATIONS 832,450   4/1960   Great Britain............ 119/48

Primary Examiner—Russell R. Kinsey
Assistant Examiner—James H. Czerwonky
Attorney—Beaman & Beaman

[57] ABSTRACT

The invention relates to a floor grate assembly comprising separate grate portions having similar configurations and designed to be placed in cages or batteries of cages for keeping poultry. If the poultry is destined to produce eggs they may roll over the floor grate. According to the invention, at least the upper side of the upper grate portion stays, which are contacted by the animal, consist of soft material and has a width suitably accommodated to the feet of the animal. Preferably, at least the upper surface of the grate stays consists of a soft plastic material, especially soft or plasticized PVC (polyvinylchloride) or rubber. The lower grate portion is formed of relatively hard material and is a direct support for the upper grate portion.

2 Claims, 5 Drawing Figures

PATENTED SEP 25 1973　　　　　　　　　3,760,769

INVENTOR
Arthur Erfeling
BY
Beaman & Beaman
attys

FLOOR GRATE IN CAGES OR BATTERIES OF CAGES FOR KEEPING POULTRY

BACKGROUND OF THE INVENTION

To increase the economy of poultry keeping farmers increasingly change over to keeping poultry in cages and batteries. When kept in cages and batteies the animals are automatically fed and watered. The removal of excreta is at the same time largely automated. To facilitate the removal of excreta the bottoms of the cages or batteries of cages predominantly consist of wire mesh with rectangular reticulation.

These wire mesh bottoms impose severe restrictions on the keeping of young poultry for fattening in cages or batteries of cages. To have to stand permanently on the wire mesh bottoms causes injuries to the animals' legs unless a minimum wire gauge of a not too small a size is used. But thicker wires cause cracked eggs because the eggs are deposited on the wire mesh bottom and roll thereon to a collecting device.

Another decisive disadvantage of the floor grates made of mesh results in connection with the behaviour of young fowls. If these young fowls are kept for chicken meat production, they are naturally lazy and have a propensity to spend their time sitting. In this case, relatively small animals are at first sitting on their shanks. But with increasing size the animals take to resting on their breastbones. In this case, and when using a hard underlayer, breast blisters will inevitably form which decisively detracts from the slaughtering quality.

SUMMARY OF THE INVENTION

It is the object of the invention to provide a floor grate which avoids the above mentioned problems.

With a floor grate of the type mentioned at the beginning, the problem is solved in that in accordance with the invention the floor grate consists of grate stays of a width suited to accommodate a foot, with at least that surface of the stays which comes into contact with the animals being formed of a material feedling soft to the animals.

The soft surfaace of the floor grate with stays of a width to accommodate a foor results in the complete elimination of leg injuries. Furthermore, breast blisters are prevented fromm forming at the breasts of fowls kept for fattening.

In accordance with another embodiment of the invention, the upper surfaces of the stays consist of a soft PVC plastic material or rubber which is applied to a carrier grate. The carrier grate in this arrangement carries the soft plastic material or rubber layer disposed thereon and takes care to impart to the floor grate a sufficient stiffness.

In another embodiment of the invention the carrier grate consists of a hard PVC synthetict material with the soft upper surface of the stays connected thereto. It may also be imagined that the floor grate consists entirely of a soft plastic material when it does not bridge too long a distance and thus a deflection does not have to be reckoned with.

In the various stages of life of the animals their feet and bodies are of different sizes. In order to allow for this circumstance, the floor grates are provided with stays which gradually broaden towards the upper surface. In this arrangement, the broadening is employed for bigger animals having bigger feet. This also makes it still more easy for the animals to sit.

Finally, in a further embodiment of the invention, the stays extending in the direction in which eggs roll project beyond the transverse stays. Hereby it is achieved that the eggs may roll to the collecting device undamaged.

BRIEF DESCRIPTION OF THE DRAWING

The invention will now be described in more detail by way of an example of embodiment which is shown in the drawings. In the drawings.

DESCRIPTION OF THE PREFERRED EMBODIMENTS

Figure 1:
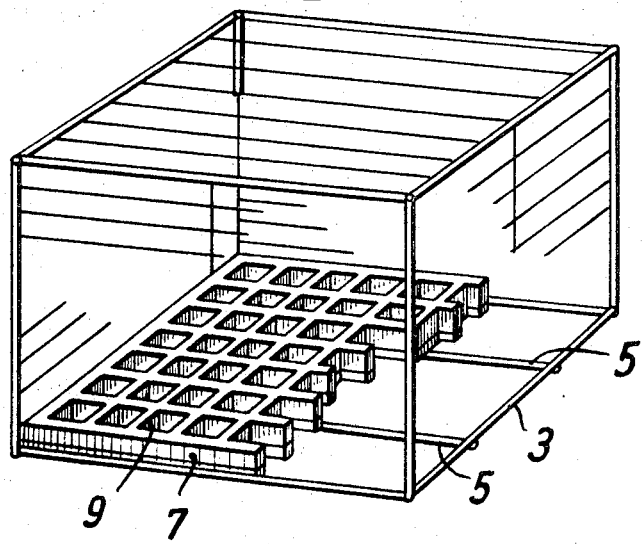
FIG. 1 shows a perspective view of a wire mesh cage for accommodating fowls with a floor grate shown in a part-sectional view, FIG. 2 a sectional view of a floor grate according to the invention, FIG. 3 a sectional view taken of another embodiment of the floor grate.

The wire mesh cage shown in FIG. 1 serves to accommodate several individual fowsl; devices for feeding and watering as well as for excreta removal having been omitted to the sake of simplicity. The wire mesh cage is provided with several supporting elements 5 at its open floor 3, which may consist of galvanized wire or upright flat iron members. On these supporting elements 5 there rests the floor grate 7 in accordance with the invention.

The floor grate in accordance with the invention consists of a grate of stays.

The stays 9 in this arrangement are of a width such that the animals may have a feeling of being safely held thereon.

Figure 2:
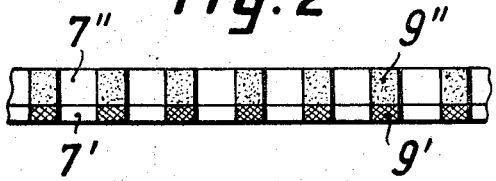

As will be seen especially distinctly from FIG. 2, the floor grate consists of a carrier grate 7' comprising individual stays 9'. The carrier grate may consist of hard PVC, for example. Above the carrier grate there is another grate 7'' which consists of stays 9'' directly connected with the stays 9' and also coinciding with these stays. The grate 7'' with the stays 9'' consists of a soft PVC or rubber which is connected with the hard PVC.

Figure 3:
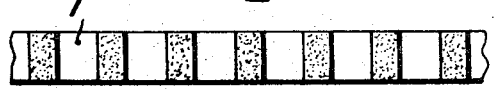

In the embodiment of FIG. 3 there is only the grate 7'' available because this grate is self-supporting and does not deflect between the supporting elements 5.

Figure 4:
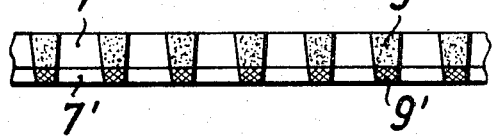
FIGS. 4 and 5 show modifications of the floor grate.
Figure 5:
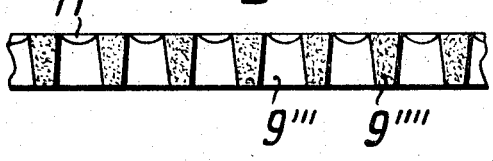

Different shapes of the stays are provided for fowls having feet of different sizes, as will be seen from FIGS. 4 and 5. In the embodiment according to FIG. 4 the grate 7'' consisting of soft material is again arranged on the carrier grate 7'. The individual stays 9' and 9'' coincide with each other and are designed in the shape of wedges in such a manner that they are widening upwardly. Another modification of the grate is shown in FIG. 5, in which the entire floor grate again consists only of one uniform soft material.

The floor grate will in general be arranged at a slight slope on the collecting device for the eggs. A good rolling action to be perforemd by the eggs will be guaranteed if the surfaces 11 of the stays or stay portions 9''' extending transversely of the rolling direction are slightly lowered with respect to the surface 90'''' of the stays extending in the rolling direction as indicated in FIG. 5. This lowering is of course applicable also to all the other embodiments of floor grates corresponding to FIGS. 1 to 4.

For raising broilers over a period of about 3 weeks, e.g., a width of about 5 – 6 mm of the grate stays is recommendable. For the same purpose a spacing of the two rows of the grate stays extending rectangularly one with respect to another, of about 20 mm has proved to be satisfactory.

What is claimed is:

1. A grated floor for poultry cages comprising, in combination, a grate assembly having an aligned separate grate lower portion and a separate grate upper portion of similar configuration, said upper portion being disposed toward the interior of the associated poultry cage, said lower portion being formed of a relatively hard material and constituting a support for said upper portion, said separate grate upper portion being directly supported by said lower portion and formed of a soft material.

2. In a grated floor for poultry cages as in claim 1 wherein said upper portion is formed of a soft PVC plastic material and said lower portion is formed of a hard PVC plastic material.

* * * * *